(12) United States Patent
Beck et al.

(10) Patent No.: US 7,455,222 B2
(45) Date of Patent: *Nov. 25, 2008

(54) SYSTEMS, METHODS AND DEVICES FOR SELLING TRANSACTION INSTRUMENTS

(75) Inventors: Randy Beck, Alpine, UT (US); Gennye Feldman, New York, NY (US); Rachel Riley Heitz, West Jordan, UT (US); John Steven Imada, Dewey, AZ (US); Paula S Martinez, North Salt Lake, UT (US); Sven Miller, Salt Lake City, UT (US); Clyde Page, South Jordan, UT (US); Steven J Keiser, South Jordan, UT (US)

(73) Assignee: American Express Travel Related Services Company, Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 11/844,663

(22) Filed: Aug. 24, 2007

(65) Prior Publication Data

US 2007/0294169 A1   Dec. 20, 2007

Related U.S. Application Data

(63) Continuation of application No. 11/556,953, filed on Nov. 6, 2006, which is a continuation of application No. 10/905,663, filed on Jan. 14, 2005, now Pat. No. 7,243,839.

(60) Provisional application No. 60/552,842, filed on Mar. 12, 2004, provisional application No. 60/522,955, filed on Nov. 24, 2004.

(51) Int. Cl.
*G06K 5/00* (2006.01)

(52) U.S. Cl. .................................. 235/380; 235/487

(58) Field of Classification Search ................ 235/380, 235/375, 379, 381, 382, 385, 487, 492, 493
See application file for complete search history.

(56) References Cited

U.S. PATENT DOCUMENTS

| 5,023,782 | A | 6/1991 | Lutz et al. |
| 5,494,544 | A | 2/1996 | Hill et al. |
| 5,577,109 | A | 11/1996 | Stimson et al. |
| 5,621,787 | A | 4/1997 | McKoy et al. |
| 5,627,909 | A | 5/1997 | Blaylock et al. |
| 5,637,845 | A | 6/1997 | Kolls |
| 5,661,289 | A | 8/1997 | Sasou et al. |

(Continued)

*Primary Examiner*—Daniel St. Cyr
(74) *Attorney, Agent, or Firm*—Snell & Wilmer L.L.P.

(57) ABSTRACT

The present invention generally relates to a system and method for distributing an open transaction instrument. The system includes the steps of: accessibly offering for sale, in a retail environment, the open transaction instrument; selling a selected open transaction instrument; and enabling the use of the open transaction instrument. The transaction instrument may be, for example, an open pre-paid card. Furthermore, accessibly offering the open pre-paid card for sale, in one exemplary embodiment, is performed by hanging the pre-paid card on a rack. The distribution of the open transaction instrument may also comprise the step of sending a message, in substantially real time, causing the pre-paid open transaction instrument to be funded but not activated. Also, in accordance with further exemplary embodiments of the present invention, an issuer system is suitably configured to leverage existing infrastructure for inventory and related processes.

25 Claims, 6 Drawing Sheets

U.S. PATENT DOCUMENTS

| | | | |
|---|---|---|---|
| D385,488 S | 10/1997 | Smith et al. | |
| 5,721,768 A | 2/1998 | Stimson et al. | |
| 5,724,523 A | 3/1998 | Longfield | |
| 5,760,381 A | 6/1998 | Stich et al. | |
| 5,769,269 A | 6/1998 | Peters | |
| 5,777,305 A | 7/1998 | Smith et al. | |
| 5,791,474 A | 8/1998 | Hansen | |
| 5,903,633 A | 5/1999 | Lorsch | |
| 5,903,830 A | 5/1999 | Joao et al. | |
| 5,903,876 A | 5/1999 | Hagemier | |
| 5,918,909 A | 7/1999 | Fiala et al. | |
| 5,953,710 A | 9/1999 | Fleming | |
| 5,971,276 A | 10/1999 | Sano et al. | |
| RE36,365 E | 11/1999 | Levine et al. | |
| 5,988,509 A | 11/1999 | Taskett | |
| 6,000,608 A | 12/1999 | Dorf | |
| 6,000,832 A | 12/1999 | Franklin et al. | |
| 6,003,016 A | 12/1999 | Hagemier | |
| 6,003,763 A | 12/1999 | Gallagher et al. | |
| 6,032,136 A | 2/2000 | Brake, Jr. et al. | |
| 6,044,360 A | 3/2000 | Piciallo | |
| 6,050,493 A | 4/2000 | Fertig | |
| 6,105,009 A | 8/2000 | Cuervo | |
| 6,106,020 A | 8/2000 | Leef et al. | |
| 6,134,309 A | 10/2000 | Carson | |
| 6,145,665 A | 11/2000 | Krahn | |
| 6,145,741 A | 11/2000 | Wisdom et al. | |
| 6,167,387 A | 12/2000 | Lee Wai Yin | |
| 6,169,975 B1 | 1/2001 | White et al. | |
| 6,173,269 B1 | 1/2001 | Solokl et al. | |
| 6,175,823 B1 | 1/2001 | Van Dusen | |
| 6,189,787 B1 | 2/2001 | Dorf | |
| RE37,122 E | 4/2001 | Levine et al. | |
| 6,209,292 B1 | 4/2001 | Krahn | |
| 6,224,108 B1 | 5/2001 | Klure | |
| 6,270,012 B1 | 8/2001 | Dawson | |
| 6,298,336 B1 | 10/2001 | Davis et al. | |
| 6,328,341 B2 | 12/2001 | Klure | |
| 6,386,444 B1 | 5/2002 | Sullivan | |
| 6,386,457 B1 | 5/2002 | Sorie | |
| 6,405,182 B1 | 6/2002 | Cuervo | |
| 6,415,142 B1 | 7/2002 | Martineau | |
| 6,422,459 B1 | 7/2002 | Kawan | |
| 6,439,613 B2 | 8/2002 | Klure | |
| 6,454,165 B1 | 9/2002 | Dawson | |
| 6,467,684 B2 | 10/2002 | Fite et al. | |
| 6,473,500 B1 | 10/2002 | Risafi et al. | |
| 6,502,745 B1 | 1/2003 | Stimson et al. | |
| 6,505,171 B1 | 1/2003 | Cohen et al. | |
| 6,507,644 B1 | 1/2003 | Henderson et al. | |
| 6,543,809 B1 | 4/2003 | Kistner et al. | |
| 6,546,373 B1 | 4/2003 | Cerra | |
| 6,563,805 B1 | 5/2003 | Ma et al. | |
| 6,575,361 B1 | 6/2003 | Graves et al. | |
| 6,581,827 B2 | 6/2003 | Welton | |
| 6,588,658 B1 | 7/2003 | Blank | |
| 6,612,487 B2 | 9/2003 | Tidball et al. | |
| 6,615,189 B1 | 9/2003 | Phillips et al. | |
| 6,615,190 B1 | 9/2003 | Slater | |
| 6,715,795 B2 | 4/2004 | Klure | |
| 6,805,289 B2 | 10/2004 | Noriega et al. | |
| 6,820,802 B2 | 11/2004 | Biggar et al. | |
| 6,820,803 B1 | 11/2004 | Browning et al. | |
| 6,829,596 B1 | 12/2004 | Frazee | |
| 6,832,720 B2 | 12/2004 | Dawson | |
| 6,837,426 B2 | 1/2005 | Tidball et al. | |
| 6,892,187 B2 | 5/2005 | Phillips et al. | |
| 6,918,537 B2 | 7/2005 | Graves et al. | |
| 7,243,839 B2 * | 7/2007 | Beck et al. | 235/380 |
| 2001/0001472 A1 | 5/2001 | Sano et al. | |
| 2001/0001856 A1 | 5/2001 | Gould et al. | |
| 2001/0038033 A1 | 11/2001 | Habib | |
| 2001/0042784 A1 | 11/2001 | Fite et al. | |
| 2001/0044733 A1 | 11/2001 | Lee et al. | |
| 2001/0047342 A1 | 11/2001 | Cuervo | |
| 2002/0026418 A1 | 2/2002 | Koppel et al. | |
| 2002/0046341 A1 | 4/2002 | Kazaks et al. | |
| 2002/0052852 A1 | 5/2002 | Bozeman | |
| 2002/0066783 A1 | 6/2002 | Sawin | |
| 2002/0077973 A1 | 6/2002 | Ronchi et al. | |
| 2002/0091573 A1 | 7/2002 | Hodes | |
| 2002/0099667 A1 | 7/2002 | Diamandis et al. | |
| 2002/0103672 A1 | 8/2002 | Torres et al. | |
| 2002/0117541 A1 | 8/2002 | Biggar et al. | |
| 2002/0120530 A1 * | 8/2002 | Sutton et al. | 705/26 |
| 2002/0153414 A1 | 10/2002 | Stoutenburg et al. | |
| 2002/0156683 A1 | 10/2002 | Stoutenburg et al. | |
| 2002/0174016 A1 | 11/2002 | Cuervo | |
| 2003/0004828 A1 | 1/2003 | Epstein | |
| 2003/0028439 A1 | 2/2003 | Cox et al. | |
| 2003/0046249 A1 | 3/2003 | Wu | |
| 2003/0053609 A1 | 3/2003 | Risafi et al. | |
| 2003/0078883 A1 | 4/2003 | Stewart et al. | |
| 2003/0183689 A1 | 10/2003 | Swift et al. | |
| 2003/0187790 A1 | 10/2003 | Swift et al. | |
| 2003/0197059 A1 | 10/2003 | Tidball et al. | |
| 2003/0197060 A1 | 10/2003 | Coyner | |
| 2003/0200179 A1 | 10/2003 | Kwan | |
| 2003/0212796 A1 | 11/2003 | Willard | |
| 2004/0007618 A1 | 1/2004 | Oram et al. | |
| 2004/0011864 A1 | 1/2004 | Thompson et al. | |
| 2004/0011866 A1 | 1/2004 | Saad | |
| 2005/0021363 A1 * | 1/2005 | Stimson et al. | 705/1 |
| 2006/0273153 A1 | 12/2006 | Ashby et al. | |

\* cited by examiner

SYSTEMS, METHODS AND DEVICES FOR SELLING TRANSACTION INSTRUMENTS

CROSS-REFERENCE TO RELATED APPLICATIONS

This application is a continuation of U.S. Ser. No. 11/556,953 entitled "SYSTEMS, METHODS, AND DEVICES FOR SELLING TRANSACTION INSTRUMENTS," which was filed on Nov. 6, 2006, which claims priority to, and the benefit of, U.S. Ser. No. 10/905,663 entitled "SYSTEMS, METHOD, AND DEVICES FOR SELLING TRANSACTION INSTRUMENTS," which was filed on Jan. 14, 2005, U.S. Provisional Application Ser. No. 60/552,842, entitled "SYSTEM, METHOD FOR PRE-PAID CARD RETAIL DISTRIBUTION," filed Mar. 12, 2004, and U.S. Provisional Application Ser. No. 60/522,955, entitled "PREPAID CARD IN-PERSON RETAIL DISTRIBUTION INVENTORY MANAGEMENT PROCESS," filed Nov. 24, 2004, all of which are incorporated herein by reference.

FIELD OF INVENTION

The present invention generally relates to transaction accounts, and more particularly, to systems and methods for facilitating the distribution of transaction instruments associated with transaction accounts.

BACKGROUND OF THE INVENTION

Consumers may use a transaction account, which may be associated with an account number and/or transaction instrument (e.g., charge card, credit card, debit card, gift card, etc.), as a form of payment or for identification in various transactions. Transaction instruments are desirable for a number of reasons such as, for example, utilizing a transaction instrument associated with a stored value (e.g., pre-paid) card may be a safe and convenient way to avoid carrying or handling cash and loose change. Also, it is often convenient to give pre-paid cards as gifts or to use pre-paid cards to pay for transactions while traveling.

Stored value cards are forms of transaction instruments associated with transaction accounts, wherein the stored value cards provide cash equivalent value that may be used within an existing payment/transaction infrastructure. Stored value cards are frequently referred to as gift, pre-paid or cash cards, in that money is deposited in the account associated with the card before use of the card is allowed. If a customer deposits ten dollars of value into the account associated with the card, the card may be used for payments up to ten dollars.

"Open cards" are cards that are generally accepted at different merchants. For example, open cards are cards that are generally accepted at merchants that are not directly affiliated with each other or within the same corporate chain. Examples of open cards include American Express®, Visa®, and Discover®, MasterCard® cards, which may be used at many different retailers and other businesses. In contrast, "closed cards" are cards that may be restricted to use in a particular store or within a particular chain of a stores. One example of a closed card is a pre-paid gift card that may only be purchased at, and only be accepted at, a clothing retailer, such as The Gap®.

In distributing open cards, additional security issues often exist compared to distributing closed cards. For example, open cards may be used in more places and through a variety of authentication systems. Thus, issuer's of open cards typically do not sell those cards as off the shelf items. In fact, open cards are generally distributed through the mail. Another method of distributing an open card involves selling a dummy 'off-the shelf' card and/or ATM only 'off-the shelf' card to a customer, whereupon a working open card is later mailed to the customer. In both cases, the mailed card is generally pre-funded or pre-approved, and for security reasons, the recipient typically calls an interactive voice response ("UVR") system to activate the card. However, the delay caused by the mailing process hinders the distribution of transaction instruments.

Banks may also distribute cards that are pre-funded and then activated via IVR, but these cards are generally kept securely behind the counter and not within the customer's reach. However, it is also desirable to distribute transaction instruments through additional channels other than banks. For example, it is often convenient for consumers to purchase transaction instruments while conducting other transactions with a third-party, such as a merchant. Similarly, an individual may wish to purchase a pre-paid card in conjunction with purchasing goods and services. In this regard, retailers such as The Gap®, sell private label, closed pre-paid cards wherein a message is transmitted to a host computer from the purchasing location upon purchase that funds and activates the card.

Thus, although various systems exist for distributing transaction instruments, although various funding systems have been used, and although various methods exist for activating a transaction account, additional systems and methods are desired to facilitate the distribution of transaction instruments. Furthermore, a need exists for systems and methods that enable a consumer to more conveniently obtain a transaction instrument such as a stored value card.

SUMMARY OF THE INVENTION

The present invention generally relates to a system and method for distributing an open transaction instrument. The method includes the steps of: accessibly offering for sale, in a retail environment, the open transaction instrument; selling a consumer selected open transaction instrument; and enabling the use of the open transaction instrument. The transaction instrument may be, for example, an open pre-paid card. Furthermore, accessibly offering the open pre-paid card for sale, in one exemplary embodiment, is performed by hanging the pre-paid card on a rack. The distribution of the open transaction instrument may also comprise the step of sending a message, in substantially real time, causing the pre-paid open transaction instrument to be funded but not activated until later through an interactive voice response system, for example. In accordance with further exemplary embodiments, an issuer system may be configured to leverage pre-existing inventory and financial settlement processing systems, such as a Travelers Cheque infrastructure.

BRIEF DESCRIPTION OF THE DRAWINGS

A more complete understanding of the present invention may be derived by referring to the detailed description and claims when considered in connection with the Figures, wherein like reference numbers refer to similar elements throughout the Figures, and:

DETAILED DESCRIPTION OF EXEMPLARY EMBODIMENTS

While the exemplary embodiments herein are described in sufficient detail to enable those skilled in the art to practice the invention, it should be understood that other embodiments may be realized and that logical and mechanical changes may be made without departing from the spirit and scope of the invention. Thus, the following detailed description is presented for purposes of illustration only and not of limitation.

In general, systems, methods, and devices are suitably configured to facilitate the distribution of a transaction instrument through a distributor (defined below), e.g., a merchant. The distribution of a transaction instrument may be facilitated by, for example, offering the transaction instrument to consumers in a manner that is readily accessible to consumers. Distribution of transaction instruments may be further facilitated by sending a "fund but do not activate" message to the issuer when the transaction instrument is distributed to the consumer. Distribution of transaction instruments may also be facilitated by using pre-existing transaction account infrastructure(s) and/or Travelers Cheque infrastructure(s) to process information communicated from the distributor and/or to provide services related to the transaction account.

Figure 1:
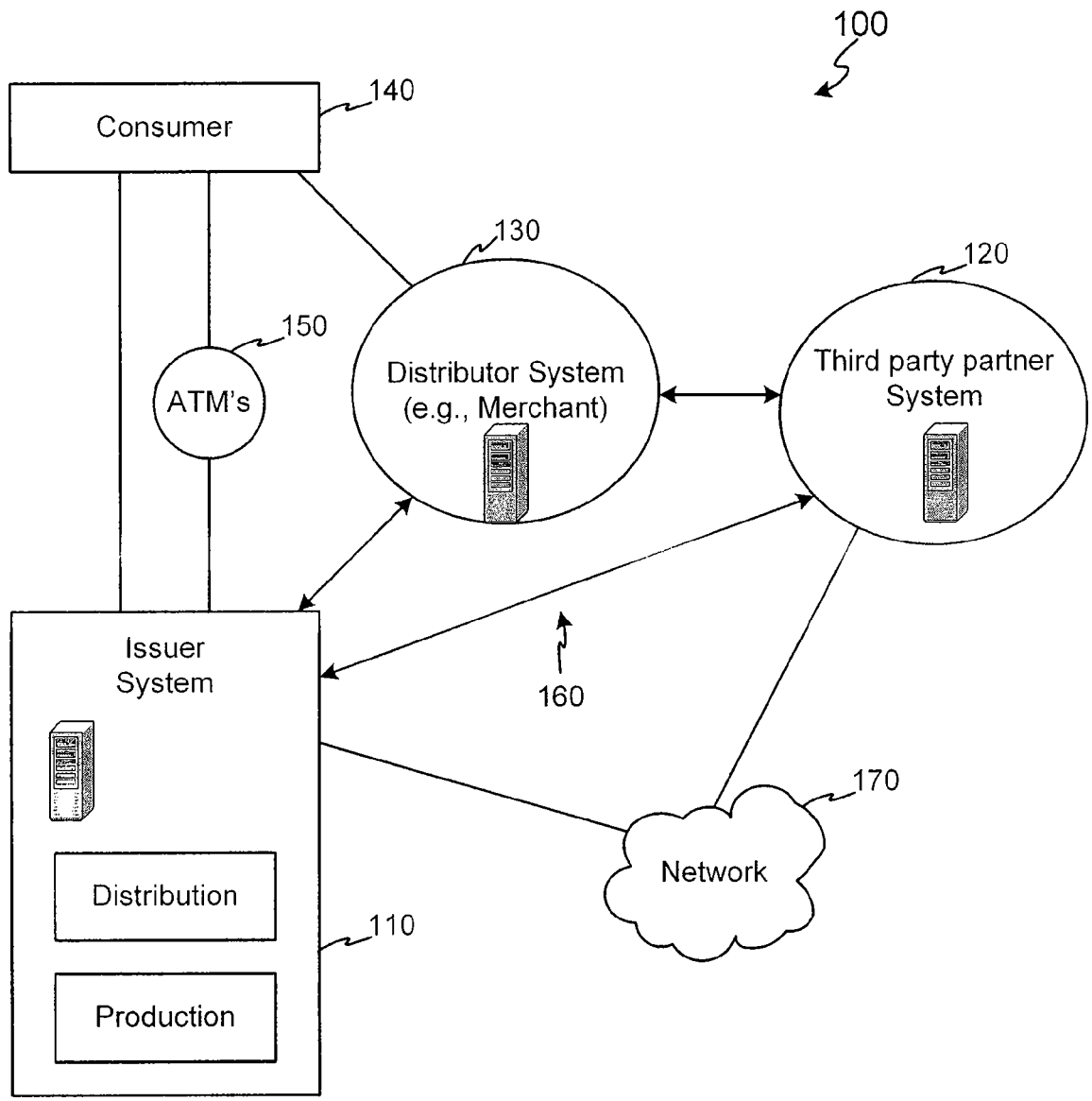
FIG. 1 illustrates a block diagram overview of an exemplary transaction instrument distribution system.

A general exemplary system configuration may include, with reference to FIG. 1, a transaction instrument distribution system 100 which comprises an issuer system 110 and a distributor system 130. Transaction instrument distribution system 100 may also comprise a third-party partner system 120. Issuer system 110 is any person, entity, software and/or hardware suitably configured to issue a transaction instrument to a consumer 140 through a distributor 130 and/or a third-party partner 120. Distribution system 130 is any person, entity, software and/or hardware suitably configured to distribute the transaction instrument to consumer 140. For example, distribution system 130 may be a merchant. Furthermore, third-party partner system 120 may serve as an intermediary between distribution system 130 and issuer system 110. Consumer 140 may use the transaction instrument with various merchants 130 or other merchants not in the distribution chain not reflected here, automated teller machines ("ATMs") 150, and/or the like. Thus, issuer system 110 may be suitably configured to communicate with third-party partner system 120, merchant system 130, consumers 140, and/or ATMs 150. In these examples, communications between any of these components may take place in various manners, for example, via a network 170, or via other modes of communication.

The systems and/or components of the systems discussed herein may also include one or more host servers or other computing systems including a processor suitably configured to process digital data, a memory coupled to the processor for storing digital data, an input digitizer coupled to the processor for inputting digital data, an application program stored in the memory and accessible by the processor for directing processing of digital data by the processor, a display coupled to the processor and memory for displaying information derived from digital data processed by the processor and a plurality of databases, the databases including distribution data, customer data, merchant data, financial institution data and/or like data that could be used in association with the present invention. As those skilled in the art may appreciate, a computer may also include an operating system (e.g., Windows NT, 95/98/2000, Linux, Solaris, etc.) as well as various conventional support software and drivers typically associated with computers.

In one exemplary embodiment of the present invention, transaction instrument distribution system 100 is suitably configured to facilitate distribution of transaction instruments through in-person marketing methods. For example, a transaction instrument, such as an open pre-paid card, may be offered by a distributor, e.g., a merchant. The merchant may present the open pre-paid card, for example, by hanging the card on a rack near the check out stand. In this example, the open, pre-paid card is accessible to the customers who may select (i.e., physically obtain) one or more pre-denominated cards, and purchase these cards with the rest of their purchases. Displaying the pre-paid card in a readily accessible manner may thus facilitate convenient acquisition of open pre-paid cards by consumers, and may therefore facilitate distribution of the pre-paid cards.

Although frequently described herein as an open pre-paid card which is associated with a transaction account, a transaction instrument, as used herein, may be associated with an open account or a closed account system. An open transaction instrument, for example, may comprise a transaction instrument that is generally accepted at different merchants. The transaction instrument may also exist in a non-physical embodiment. For example, a transaction instrument may be distributed in non-physical embodiments such as an account number, frequent flyer account, telephone calling account, and/or the like. Furthermore, a physical embodiment of a transaction instrument may be distributed as a charge card, credit card, debit card, loyalty card, pre-paid card, diner's card, phone card, transponder, and/or the like.

Furthermore, transaction accounts may be associated with various applications that allow the customers to participate in various programs, such as, for example, loyalty programs. A loyalty program may include one or more loyalty accounts. Exemplary loyalty programs include frequent flyer miles, on-line points earned from viewing or purchasing products at websites on-line, and programs associated with diner's cards, charge cards, credit cards, debit cards, hotel cards, and/or the like. Generally, the user is both the owner of the transaction account and the participant in the loyalty program; however, this association is not necessary. For example, a participant in a loyalty program may gift loyalty points to a user who pays for a purchase with his own transaction instrument, but uses the gifted loyalty points instead of paying the monetary value.

In accordance with another aspect of the present invention, the transaction instrument may be distributed via any suitable distribution technique. For example, the transaction instrument may be purchased by the distributor and resold to a consumer. In another exemplary embodiment, however, the transaction instrument may be consigned to the distributor who, upon sale to a consumer, pays the issuer. Other distribution techniques may also be employed. For example, transaction instruments may be distributed for free, e.g., as part of a promotional activity.

In one exemplary embodiment, the transaction instrument comprises an open pre-paid card that is un-funded and not activated when on display by a merchant. The card is funded upon purchase by a consumer and enabled, i.e. activated, via an automated activation system. One exemplary automated activation system is an IVR system. The open card may be used at a variety of merchants. Thus, transaction instrument distribution system 100 facilitates convenient distribution of transaction instruments.

Although described as a merchant system herein, in general, distributor system 130 may be any service provider, retailer, financial institution, travel agency, or other entity that performs in-person distribution of a transaction instrument. The term 'retail environment' should be construed broadly to encompass any environment where product is accessible to the public for the public's selection, such as where product is accessibly displayed on counters, shelves, display racks, and/or the like. Furthermore, in one exemplary embodiment, a merchant may comprise an entity that offers goods where product is accessible to consumers. As such, the merchant may exist in a variety of environments, including, but not limited to retail stores, banks, credit unions, and/or the like. In accordance with various exemplary embodiments of the present invention, distributor system 130 is suitably configured to offer transaction instruments to consumers in a manner whereby the consumers may physically select/obtain the transaction instrument. For example, the transaction instrument may be a card and the card may be associated with a package. In this example, the packaged card may be displayed by hanging the package on a rack display. The packaged card may also be displayed by placing the package on a display shelf, in a vending machine, or through other suitable display techniques. These exemplary methods of displaying the package facilitate selection by a consumer of the package. The consumer may then begin the process of acquiring ownership of the package, for example, by picking up the package and adding it to their shopping cart. In other exemplary embodiments, the transaction instrument is distributed without packaging.

Although the present invention contemplates the sale of transaction instruments to consumer 140, in other embodiments, transaction instruments may be distributed to merchants or consumers for free. In accordance with other aspects of the present invention, distributor system 130 may process purchases and communicate transaction information with issuer 110 upon sale of an item. For example, distributor system 130 may sell DVD's, produce, toys, food, hardware, and/or the like, and may communicate (directly or indirectly) with the issuer of a charge card, credit card, a pre-paid card, and/or the like to reconcile payment for these purchases.

In general, distributor system 130 is similarly configured to communicate with issuer system 110 in connection with the distribution of the transaction instrument. The information communicated may vary depending on the distribution technique used, the type of transaction instrument, the security systems in place, and/or the like. In one exemplary embodiment, distributor system 130 comprises hardware and/or software, such as a cash register, having a point of sale device integrated therein. Distributor system 130 may have a computing center such as a mainframe computer. However, the computing center of distributor system 130 may be implemented in other forms, such as a personal computer, a mini-computer, a PC server, a network set of computers, or the like.

The computer is suitably configured to receive input identifying the transaction instrument to be distributed. For example, the computer may be suitably configured to scan a bar code (or read a magnetic stripe) and receive information identifying the transaction instrument being purchased. The scanned/read information may comprise an account number. This information may be scanned/read from the card itself or from the package. In one exemplary embodiment, the account number is the issuer's account number corresponding to that transaction instrument. In another embodiment, the account number is, for example, the third party distribution partner's account number or serial number. The computer may further be suitably configured to compare the identifying information to inventory recorded in a database, to look up the sales price, and/or to calculate the sales price associated with the transaction instrument.

In one embodiment, for example, a third-party partner account number is scanned from the package holding a pre-paid card and the purchase price is looked up from inventory. The third-party partner account number, the purchase price of the card, and the merchant's own identification number may be communicated to the third party partner who may convert the third-party partner account number to the issuer's corresponding account number and forward this information to the issuer.

Furthermore, the merchant computer may be suitably configured to send a Fund/Init message (as defined herein) to the issuer. The Fund/Init message may comprise the account number scanned from the package (e.g., the issuer's account number or the third party's account number), the value of the transaction (e.g., dollar amount), and/or a merchant number identifying the merchant selling this transaction instrument. The Fund/Init message may further be a message that requests approval of sale of the transaction instrument. The computer may also be suitably configured to receive an 'approved/authorized' message that authorizes the sale of the pre-paid card. Furthermore, the Fund/Init message may be a message that causes the transaction account to be funded upon distribution of the related transaction instrument. Moreover, the Fund/Init message may be sent, substantially in real time, i.e. at about the time of the distribution/sale of the transaction instrument. In yet further exemplary embodiments, distributor system 130 may be configured to send a signal, and not necessarily a Fund/Init signal, to third party partner system 120. This signal may comprise the third party's account number, the value of the transaction, and/or the merchant number identifying the merchant selling this transaction instrument. The third party partner system may be configured to recognize that signal as a request to approve the sale of the transaction instrument, and to convert the third party account number to the corresponding issuer account number. In this example, it is third party partner system 120 that is configured to send a Fund/Init message to the issuer.

Distributor system 130, e.g., a merchant, may also be suitably configured to distribute other information. In one exemplary embodiment, the information communicated includes the consumer name, an account number, a sequential number, the date of distribution of the transaction instrument, the time of distribution, the place of distribution, the type of transaction instrument distributed, and/or the like. The communicated information may be useful for issuer system 110 and distributor system 130 to reconcile amounts owed between themselves, to track inventory, to limit fraud, to activate the transaction account, and/or to provide additional services. This other information may be sent at the time of the purchase, or as a batch process on a periodic basis. Some of this information may, for example, be communicated via batch processing that is performed on a daily basis, in real time, and/or at some other appropriate interval. The some of this information may be communicated to issuer 110 directly in electronic format or indirectly in a verbal, or printed format that later is entered in electronic format into issuer system 110.

The distributor system 130 may include a computer that may be suitably configured to access a suitable website or other Internet-based graphical user interface that is accessible by users. In one embodiment, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access or SQL Server, Oracle, Sybase, Informix MySQL, Intervase, etc., may be used to provide an ADO-compliant database management system. The term "webpage" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and/or the like.

Issuer system 110 may include any software, hardware, financial institution, credit card company, bank, business, and/or the like that is capable of issuing a transaction instrument. Issuer system 110 may also be suitably configured to receive a Fund/Init message, process a request for sale of a transaction instrument, and/or return an authorization/approval message.

In accordance with exemplary embodiments, issuer system 110 may include a production system for producing physical embodiments of transaction instruments and/or for creating the associated transaction accounts. In addition, issuer system 110 may comprise systems that are suitably configured to track inventory, receive information from distributor system 130, receive information from third-party partner system 120, identify fraud, replace lost transaction instruments, send commission payments, receive amounts owed, perform accounting, and/or the like for transaction instruments and/or associated transaction accounts.

By way of example, issuer system 110 may be a financial institution that issues a pre-paid card to distribution system 130, e.g., a merchant. For example, issuer system may consign the transaction instrument to the merchant. In this example, issuer system 110 may further pay a commission to the distributor and/or receive payment from the distributor.

In another exemplary embodiment, issuer system 110 is configured with, for example, a card authorization system, that may be suitably configured to receive a message from a point of sale device at distributor system 130. The card authorization system may be suitably modified to recognize a Fund/Init message from distributor system 130 or third party partner system 120. For example, a Fund/Init message may be similar to a standard transaction message with one or more fields changed to indicate that a customer desires to acquire a particular transaction instrument. The field(s) that are changed may comprise, for example, "message type", "processing code", "function code", and/or the like. Information sent in the Fund/Init message may include, for example, the relevant transaction account number, an indication that it is being sold, and/or a request to find the transaction account. Upon recognizing the Fund/Init message, the card authorization system may be suitably configured to send a message to a processing system. For example, with reference to a stored value card, a message may be passed to a stored value card processing system (e.g., SVCAP).

The stored value processing system may comprise a logic system that can check to see if the card status is 'already sold', and/or (but not limited to) whether the card status is 'at the merchant'. In one exemplary embodiment, the stored value processing system may query an appropriate database to check the card status. Furthermore, the stored value processing system may, upon determining that the card can be sold, (1) adjust the card status in the database to 'sold', and/or (2) send an authorization signal back, through the card authorization system, to the point of sale device.

In one exemplary embodiment, issuer system 110 may be further configured with an interactive voice response system ("IWR") that may be suitably configured to receive a request from a customer to activate a purchased transaction instrument (e.g., card). The IVR may be suitably configured to check an appropriate database and determine if the status of the card is "sold". The IVR may also be configured to inform the customer, if the card status happens to be 'sold', that the card is activated and/or to activate the card. For example, the card may be activated by adjusting the status of the card in a suitable database.

In this manner, issuer system 110 may be configured to facilitate a user purchasing, for example, a pre-paid card and activating the pre-paid card right away. In one embodiment, transaction instrument distribution system 100 may be configured to facilitate activation (and thus use) of a transaction instrument within seconds after the transaction instrument is distributed (e.g., purchased). In other embodiments, the transaction instrument may be used within less than 5 minutes of the purchase, within 24 hours of purchase, or at anytime after that. In further exemplary embodiments, the transaction instrument may be used to conclude purchases made at the time of the purchase of the transaction instrument. Other automated and non-automated activation system may also be used to activate the transaction accounts. For example, customer service representatives may be called to activate an account, or an account may be activated via the internet.

Issuer system 110 may also include, for example, an inventory and financial settlement processing system, which operates using serial number logic. For example, issuer system 110 may include a Travelers Cheque system for creating Travelers Cheques, for delivering the Travelers Cheques to distributors, and for tracking inventory, preventing fraud, replacing lost transaction instruments, sending commission payments, receiving amounts owed, performing accounting, and/or the like. These established infrastructures (e.g., Travelers Cheque infrastructures) may, in accordance with one aspect of the present invention, be leveraged to perform similar functions for the distribution of transaction instruments. Thus, issuer system 110 may, in accordance with one aspect of the present invention, avoid the creation of new systems that facilitate this new method of distributing transaction instruments. Therefore, issuer system 110 may leverage a pre-existing inventory and/or financial settlement processing infrastructure (e.g., Travelers Cheque infrastructure) to receive information received from merchant system 130, to process the information, and/or to provide other services related to the pre-paid card. For additional information related to leveraging a Travelers Cheque infrastructure, see for example, U.S. Non-Provisional patent application Ser. No. 10/707,779, filed Jan. 12, 2004, entitled "SYSTEMS, METHODS, AND DEVICES FOR SELLING TRANSACTION ACCOUNTS", which is incorporated herein by reference.

In various exemplary embodiments, issuer system 110 may distribute transaction instruments to consumers 140 using an intermediary third-party partner system 120. Third-party partner system 120 may be suitably configured to perform many of the tasks discussed with reference to issuer system 110 and/or distributor system 130. Furthermore, in this exemplary embodiment, merchant 130 may be suitably configured to send a transaction signal to third-party partner system 120 and to receive an approved/authorized message from third-party partner system 120. Similarly, issuer system 110 may be suitably configured to receive a Fund/Init message from third-party partner system 120 and to provide an approved/authorized message to third-party partner system 120. In accordance with an exemplary embodiment, third-party partner system 120 may also comprise a database for converting the identification number associated with the transaction instrument from a third party partner's number to the issuer's number. For example, a merchant may send a transaction signal including the third-party partner system's account number to the third-party, whereupon that number is converted to an issuer number and a Fund/Init signal is sent to the issuer along with the issuer number.

As used herein, the terms "user", "end user", "consumer", "customer" or "participant" may be used interchangeably with each other, and each shall mean any person, entity, machine, hardware, software, business, issuer system, and/or distributor system. A user may acquire by gift, purchase, or the like, a transaction instrument, for example, an open prepaid card, and may use that card at different merchants to complete a purchase. Also, each user may be equipped with a computing system to facilitate online commerce transactions. For example, the user may have a computing unit in the form of a personal computer, although other types of computing units may be used including laptops, notebooks, hand held computers, set-top boxes, and/or the like. The user computer may be in a home or business environment with access to a network. In an exemplary embodiment, access may be through the Internet through a commercially available webbrowser software package.

Furthermore, the terms "business" or "merchant" may be used interchangeably with each other and shall mean any person, entity, distributor system, software and/or hardware that is a provider, broker and/or any other entity in the distribution chain of goods or services. For example, the merchant may be a grocery store, an on-line merchant, airline, hotel, and/or the like. With regard to use of the open transaction instrument, the user may communicate with the merchant in person (e.g., at the box office), telephonically, or electronically (e.g., from a user computer via an internet). During the interaction, the merchant may offer goods and/or services to the user. The merchant may also offer the user the option of paying for the acquisition using a transaction instrument. Furthermore, the transaction instrument may be used by the merchant as a form of identification of the user. The merchant may have a computing unit implemented in the form of a computer-server, although other implementations are possible.

In general, the transaction instrument may be used for transactions much like other transaction instruments. Communication between the user and/or merchant and the system of the present invention is accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art may also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

It may be appreciated that many applications of the present invention could be formulated. One skilled in the art may appreciate that a network may include any system for exchanging data or transacting business, such as the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant (e.g., Palm Pilot®), handheld computer, cellular phone and/or the like. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris or the like. Moreover, although the invention is frequently described herein as being implemented with TCP/IP communications protocols, it may be readily understood that the invention could also be implemented using IPX, Appletalk, IP-6, NetBIOS, OSI or any number of existing or future protocols. Moreover, the system may contemplate the use, sale or distribution of any goods, services or information over any network having similar functionality described herein.

The computing units may be connected with each other via a data communication network. The network may be a public network and assumed to be insecure and open to eavesdroppers. In the illustrated implementation, the network may be embodied as the internet. In this context, the computers may or may not be connected to the internet at all times. For instance, the customer computer may employ a modem to occasionally connect to the internet, whereas the bank computing center might maintain a permanent connection to the internet. Specific information related to the protocols, standards, and application software utilized in connection with the Internet may not be discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997). LOSHIN, TCP/IP CLEARLY EXPLAINED (1997). All of these texts are hereby incorporated by reference.

The systems may be suitably coupled to the network via data links. A variety of conventional communications media and protocols may be used for data links. For example, a connection to an Internet Service Provider (ISP) over the local loop as is typically used in connection with standard modem communication, cable modem, Dish networks, ISDN, Digital Subscriber Line (DSL), or various wireless communication methods. The merchant system might also reside within a local area network (LAN) that interfaces to the network via a leased line (T1, D3, etc.). Such communication methods are well known in the art and are covered in a variety of standard texts. See, e.g., GILBERT HELD, UNDERSTANDING DATA COMMUNICATIONS (1996), hereby incorporated by reference.

The distributor, third-party partner, and/or the issuer may be interconnected via a second network and/or a third network, each referred to as a payment network. The payment network which may be part of certain transactions represents existing proprietary networks that presently accommodate transactions for charge cards, credit cards, debit cards, and other types of financial/banking cards. The payment network is a closed network that is assumed to be secure from eavesdroppers. Exemplary transaction networks may include the American Express®, VisaNet® and the Veriphone® networks.

Any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. In this regard, the data corresponding to the key field in each of the linked data tables is preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN. 1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a Block of Binary (BLOB). Thus, any binary information may be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first issuer, a second data set which may be stored may be provided by an unrelated second issuer, and yet a third data set which may be stored, may be provided by an third issuer unrelated to the first and second issuer. Each of these three exemplary data sets may contain different information that is stored using different data storage formats and/or techniques. Further, each data set may contain subsets of data which also may be distinct from other subsets.

As stated above, in various embodiments of the present invention, the data may be stored without regard to a common format. However, in one exemplary embodiment of the present invention, the data set (e.g., BLOB) may be annotated in a standard manner when provided for manipulating the data onto the financial transaction instrument. The annotation may comprise a short header, trailer, or other appropriate indicator related to each data set that is suitably configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be suitably configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be suitably configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified merchants are permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device suitably configured to add, delete, modify, or augment the data in accordance with the header or trailer. As such, in one preferred embodiment, the header or trailer is not stored on the transaction instrument along with the associated issuer-owned data but instead the appropriate action may be taken by providing to the transaction instrument user at the stand alone device, the appropriate option for the action to be taken. However, the present invention contemplates a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the present invention may consist of any combination thereof at a single location or at multiple locations, wherein each database or system includes any of various suitable security features, such as firewalls, access codes, encryption, decryption, compression, decompression, and/or the like.

Figure 2:
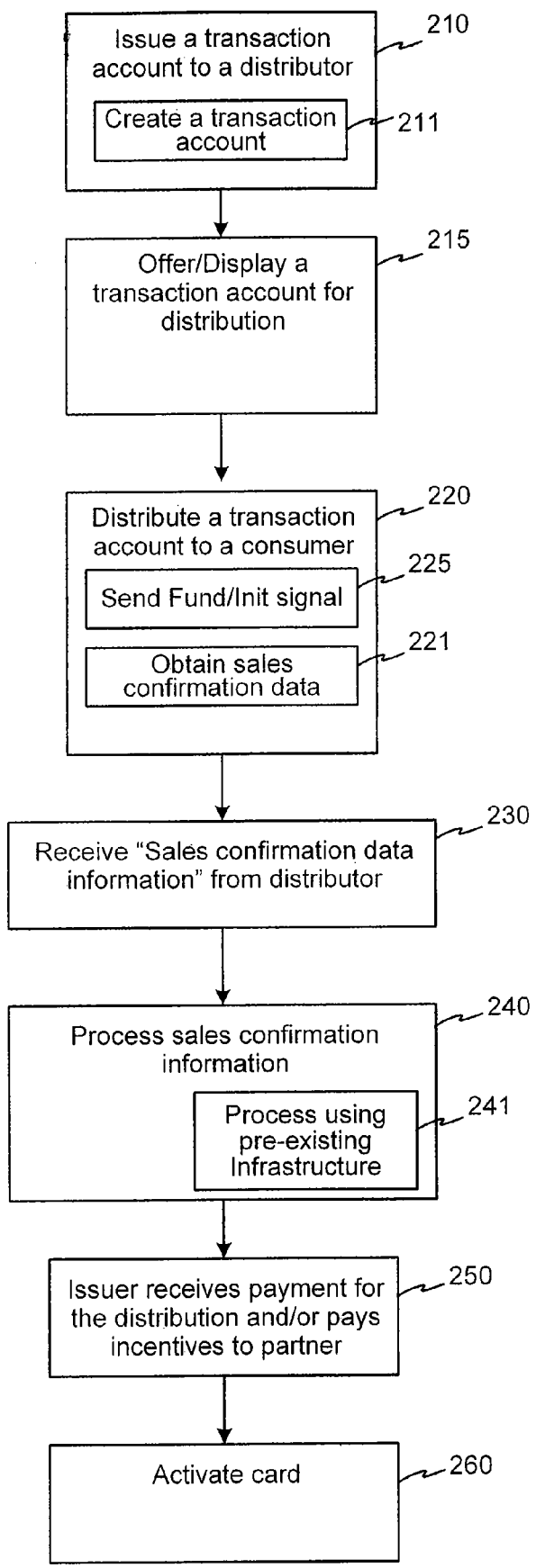
FIG. 2 illustrates a flow diagram showing an exemplary transaction instrument distribution method.

The foregoing system components may be suitably configured for performing the following method which may facilitate the distribution of a transaction instrument. With reference to FIG. 2, an exemplary method 200 may comprise one or more of the following steps: issuing a transaction instrument to a distributor (step 210), offering the transaction instrument in a consumer accessible manner (e.g., at a retail establishment) (step 215), distributing the transaction instrument to customers (step 220), sending a Fund/Init message (step 225), sending sales confirmation information to the issuer (step 230), and/or processing the sales confirmation information (step 240) via, a pre-existing infrastructure, for example, a Travelers Cheque infrastructure.

In accordance with various exemplary embodiments of the present invention, issuing the transaction instrument to a distributor (step 210) may include the step of creating the transaction instrument (step 211). Creation of the transaction instrument may include both electronic and physical activities. For example, a card may be created physically and/or the related account created electronically. The transaction account may be created electronically by, for example, creating an account number that is associated with the transaction instrument. The account number may be, for example, a credit card number or other number as described herein. For security reasons, the account number may be a random number and/or the account number may also include routing information prior to the random number. The account number may be associated with other account specific information in a database, look up table and/or the like. For example, in a stored value account, the account may be suitably configured to be worth a particular number of minutes, a predetermined value, a specific reward, and/or the like.

In addition to the account number, a serial number or any other identifier may be associated with the transaction instrument and/or transaction account. In accordance with various exemplary embodiments, the serial number is a sequential number. The sequential number may, among other things, facilitate the tracking of inventory.

With regard to transaction instruments involving a physical transaction instrument, the financial transaction instrument may comprise, for example, a magnetic stripe card, smart card, bar code card, transponder, and/or the like. Issuer system 110 may provide a card account number and a serial number to a manufacturer that produces the physical transaction instrument, encodes the instrument, and/or packaging for the transaction instrument. The manufacturer may create, for example, a card. The manufacturer may further package the card by inserting the card into an envelope.

The packaged transaction instruments may be shipped to third-party partner systems 120 and/or distribution centers which may provide the packaged transaction instruments to distributor system 130. Issuing the transaction instrument (step 210), in one exemplary embodiment, includes consigning the transaction instrument to the distributor. For example, upon delivery, a distributor may sign a receipt acknowledging responsibility for the delivered set of pre-paid cards which may be individually identified on the receipt. This receipt may be mailed, faxed, or electronically transmitted to the issuer to confirm receipt of the pre-paid cards. In other exemplary embodiments, issuing the transaction instrument includes selling and/or consigning the transaction instrument (or the right to distribute the same) to the distributor. One skilled in the art will appreciate that the distribution centers may not be necessary. For example, the transaction instruments may be distributed directly to consumers. The distributor may also add the product to their own inventory system.

The distributor may offer (step 215) the transaction instrument to consumers using various techniques. For example, a merchant may hang packaged pre-paid open cards on a rack near a check out counter. Similarly, pre-paid open cards may be displayed on a shelf, or other suitable display device. Thus, offering the transaction instrument in a consumer accessible manner comprises any method of making physically accessible to a consumer the acquisition of a transaction instrument. For example, a physical package or card is displayed within reach of a customer. Thus, a customer may select (i.e., physically acquire), for example, a pre-denominated open card from a rack of cards, and proceed to purchase the card along with other groceries or products selected by the consumer. In one embodiment, the account number or cards may be distributed via a kiosk, computer terminal, ATM (e.g., on an ATM receipt) or over the phone. For additional information related to distribution of an account number, see for example, U.S. Ser. No. 08/456,525 filed on Jun. 1, 1995 by inventor John M. Taskett and entitled METHODS AND APPARATUS FOR PROVIDING A PREPAID, REMOTE ENTRY CUSTOMER ACCOUNT, which is hereby incorporated by reference.

Furthermore, the transaction instruments may be distributed from behind the counter using the Fund/Init message. In yet another exemplary embodiment, a transaction instrument may be distributed via the internet using a Fund/Init message.

The distributor may distribute the transaction instrument (step 220) using various techniques. For example, the distributor may sell the transaction instrument to customer 140. However, the distributor may give the transaction instrument to a customer for free or even entice a customer to obtain the transaction instrument in exchange for value. For example, a merchant might offer incentives, such as T-shirts, low interest rates, or other rewards with each credit card that is distributed to customer 140. Other techniques for distributing the transaction instrument may also be used.

Distributing the transaction instrument (step 220) may further comprise the step of obtaining an identification number from the package and/or transaction instrument. The identification number may identify or relate to the associated transaction account of the transaction instrument that is being purchased or the transaction instrument itself. In one exemplary embodiment, the identification number is a serial number that is manually read off the package or card and typed in by hand, or that is machine read from a bar code or magnetic stripe on the package or the card. The serial number may be compared to a database containing inventory information. It may thus be determined that, for example, a $25 gift card is being presented for purchase. In one embodiment, the database may return a price to charge for the selected card, e.g., $27.95.

Distributing the transaction instrument (step 220) may additionally include the step of sending a Fund/Init message to issuer system 110, for example, upon purchase of the transaction instrument (step 225). The Fund/Init message may include information that causes issuer system to recognize the message as representing a request to sell a selected transaction instrument. Issuer system 110 may process the request, and if appropriate, send an approved/authorized message to distributor system 130. Issuer system 110 may also update its database(s) to note that the specified transaction instrument is sold. Issuer system 110 may also update its database(s) to note that the transaction account associated with the specified transaction instrument is funded. Distributing the transaction instrument (step 220) may additionally include the steps of receiving the approved/authorized message, and transferring ownership of the transaction instrument to the consumer. However, at this time, the transaction account associated with the purchased transaction instrument may be funded but not activated.

The transaction account may be funded at the point of sale. However, the transaction account may, in other embodiments be funded at a later point in time. For example, the account may be funded when a batch transmission is processed (e.g., that night). Nevertheless, in exemplary embodiments, the account is not activated at the time of funding.

Distributing the transaction instrument (step 220) may, for example, also include verification of a pre-determined funding level. In one exemplary embodiment, a pre-paid card is pre-denominated for a specific amount (e.g. $50). Merchant 130 may communicate to the issuer, among other things, the amount of the pre-denominated card. This may be communicated, for example, in the Fund/Init signal. If the pre-denominated amount communicated by the merchant does not match the pre-denominated amount associated with that transaction account (in the issuer's database), the issuer may not approve the sale and/or funding of the card.

In some exemplary embodiments involving a third-party partner, the primary contact with the merchant is through the third-party partner. Thus, the merchant system is suitably configured, in this case, to send a signal to third-party partner system 120. Third-party partner system 120, in turn recognizes the signal as a request to distribute a transaction instrument, and translates the serial number and/or card number (accompanying or included in the signal) to a corresponding issuer account number or serial number, which is forwarded by third-party partner system 120 to issuer system 110 with a Fund/Init message. Approval/authorization of the distribution of the transaction instrument is similarly sent to third-party partner system 120 to be converted and/or conveyed back to merchant system 130.

The direct, or indirect, distribution of the transaction instrument may further involve the collection of "sales confirmation" data. Step 221. This sales confirmation information may be collected by the distributor (e.g., a merchant), by the third-party partner system, or through other means. Furthermore, this sales confirmation information may be collected at the time of sale, immediately after the sale, or at a later point in time. The sales confirmation information may include, for example the date of the sale, the time of the sale, the card number, an associated serial number, the face value of the pre-paid card, the approval code for the distribution of the transaction instrument, and/or the like. In an exemplary embodiment, the sales confirmation information is captured at the time of sale, and is sent via batch processing to the issuer at a later time, such as later that night.

All or any portion of this sales confirmation data may be communicated to the issuer system (step 230). In one embodiment, sales confirmation information may include the Fund/Init signal. In various exemplary embodiments, the sales confirmation information may facilitate correlating a request to sell a transaction instrument with the appropriate account number. For example, the sales confirmation information may be transmitted to the issuer system and it may include an account number. In one exemplary embodiment, the account number comprises at least a portion of a machine readable code, such as a bar code. In another example, the account number may be stored in a magnetic stripe encoded format. Distributor system 130 may be suitably configured to recognize the codes and, based on the codes, to determine the account number that corresponds to the codes, the amount that the distributor owes to the issuer, and/or the like. In other exemplary embodiments, the account number may be entered into an electronic system manually or by other means (bar code, machine readable code, etc.)(step 232). For example, an internet webpage based system may be suitably configured with fields for manual or automatic entry of an account number as well as other information comprising the sales confirmation information. The fields may, for example, be similar to fields used in connection with distributing Travelers Cheques;

however, other formats may also be used. The American Express "Express Check" software is one example of such a system. Moreover, the internet webpage may be suitably configured to transmit/communicate sales confirmation information to an issuer in other suitable formats.

The sales confirmation information may be stored and transmitted in batches, or transmitted in substantially real time. A batch transmission of sales confirmation information may, for example, include several transactions including various products, individual transaction information, and/or summary information. For example, a single batch transmission may comprise the transmission of a file containing a summary of amounts the distributor owes to the issuer, the total number of pre-paid cards sold, and sales confirmation information specifying the account number of the sold pre-paid cards. This information may be transmitted to the issuer as a settlement file. In another exemplary embodiment, the sales confirmation information is communicated to issuer system 110 via the internet or other suitable communication systems. The issuer receives the sales confirmation information and may process the information (step 240).

Processing of the sales confirmation information may take place through a combination of systems that may already be established at issuer system 110. For example, issuer system 110 may comprise a transaction account infrastructure (e.g., a pre-paid card infrastructure), a pre-existing inventory system and/or a pre-existing financial settlement processing system. In one exemplary embodiment, issuer system 110 may comprise, a pre-paid card infrastructure that is suitably configured to receive and process the sales confirmation information. For example, the pre-paid card infrastructure may be configured to match the sales confirmation information with the Fund/Init message and to transmit data to a pre-existing inventory system and/or a pre-existing financial settlement processing system. The pre-existing inventory system may, for example, utilize serial number logic.

Moreover, through the pre-existing financial settlement processing systems, issuer system 110 may pay the distributor a commission for the distribution of the transaction instrument (step 250). In accordance with one exemplary embodiment of the present invention, the commission payment system may be similar to that used in paying commissions for sales of Travelers Cheques, although other systems may also be used. Also, a pre-existing inventory system may perform inventory management and accounting related to the distribution of a transaction instrument. Thus, as an example, a pre-paid card infrastructure may receive sales confirmation information, match that information with the Fund/Init message, and provide data to a Travelers Cheque infrastructure that performs inventory and settlement functions. Thus, financial transaction instrument distribution system 100 may be suitably configured to leverage the functions and services of pre-existing Travelers Cheque, ATM, POS and/or transaction account infrastructures by receiving communications through pre-paid card, Travelers Cheque, POS and/or ATM communication systems and sharing information between infrastructures.

In accordance with yet another exemplary embodiment of the present invention, issuer system 110 may be suitably configured to activate the transaction account (step 260). Various methods of activating the transaction account may be used, including, for example, automated activation systems such as web based activation systems, interactive voice response systems, and/or the like, and non automated activation systems such as customer service representatives, and/or the like. The purchaser of a pre-paid card, for example, may call a customer service representative or an interactive voice response system associated with a pre-paid card infrastructure to activate the pre-paid card. In one exemplary embodiment, if the transaction account associated with a transaction instrument has been flagged as "sold", the IVR system is suitably configured to honor a request to immediately activate the transaction account. Thus, a newly purchased open prepaid card may be used sooner, encouraging consumers to purchase the cards.

In other exemplary embodiments, the issuer system (for example, the pre-paid card system) may be suitably configured to verify that activation is appropriate. For example, the infrastructure may be suitably configured to verify that this particular card has been sold. Furthermore, the purchaser may be asked to provide information including, but not limited to: the card number, security code on the card, their date of birth, the last four digits of their social security number, and/or the like for the purposes of confirming that activation is appropriate. The direct, or indirect, distribution of the transaction instrument may further involve collecting information from the customer. The customer information may include, for example, the customer name, password, social security number, birth date, survey information, loyalty program information and other personal identification information, and/or the like. This customer information may be collected from the customer by the distributor (e.g., a merchant) or through other means (e.g., internet, call centers, and/or the like). Furthermore, this customer information may be collected at the time of sale, immediately after the sale, or at a later point in time.

The infrastructure may further be suitably configured to detect fraud (e.g., detect an attempt to use a card that has not yet been sold), to refund or replace a lost transaction instrument, to track product inventory, to know when and how much to pay sellers as a commission, and to collect from sellers for the consignment sale. For example, if customer 140 reports a transaction instrument as lost or stolen, the issuer may determine if that transaction instrument was sold, where it was sold, etc. and thereby ask the customers questions to determine if the customer is entitled to a refund. Collection of customer information may also take place during this activation process.

Figure 4:
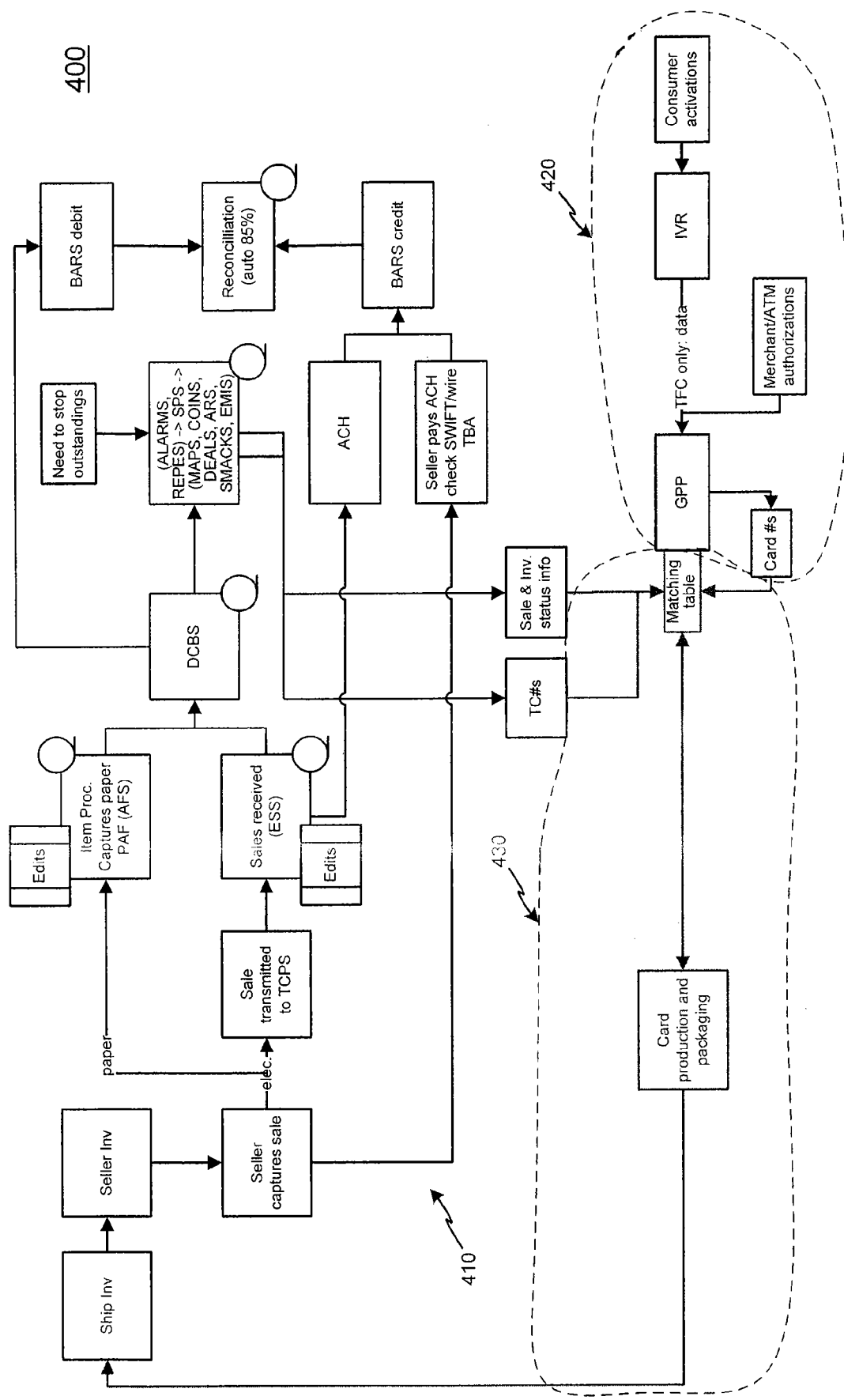
FIG. 4 illustrates a block diagram overview of an exemplary Travelers Cheque infrastructure and an exemplary transaction card infrastructure.

FIG. 4 illustrates an exemplary system 400 that is suitably configured to facilitate the distribution of a transaction instrument. System 400 combines an exemplary Travelers Cheque infrastructure 410 and an exemplary transaction account infrastructure 420. Various pre-existing inventory and financial settlement infrastructures (e.g., Travelers Cheque infrastructures) and transaction card infrastructures may be used in system 400, and therefore the details of infrastructures 410 and 420 are not explained in detail. In one exemplary embodiment, transaction account infrastructure 420 may be a pre-paid card infrastructure suitably configured with an interactive voice response system facilitating consumer activation. Transaction account system 420 may be suitably configured to provide card numbers to a matching table and to communicate with the matching table, providing new functionality 430. Travelers Cheque infrastructure 410 may be suitably configured to provide Travelers Cheque numbers and/or sales and inventory status information to a matching table. Thus, the matching table may facilitate card production and packaging. The newly produced inventory may then be passed to an inventory shipping process within Travelers Cheque infrastructure 410 and infrastructure 410 may, for example, facilitate the distribution of the pre-paid cards. Various other links and communication of information between infrastructures 410 and 420 may also be used to facilitate distribution of transaction instruments.

From the issuer's perspective, in accordance with various aspects of the present invention, an issuer is able to facilitate the distribution of transaction instruments. The issuer creates the transaction instruments, issues the transaction instruments to a distributor, receives information back from the distributor upon distribution of the transaction instrument, and processes the information received. The issuer funds the transaction account upon sale, and activates the transaction account via, for example, an IVR system. In one exemplary embodiment, the information is received by the issuer's Travelers Cheque infrastructure and processed by the issuer's Travelers Cheque and/or transaction account infrastructure(s). Thus, the issuer leverages one or more existing systems to distribute transaction instruments.

From the distributor's perspective, in accordance with another aspect of the present invention, a distributor may distribute a transaction instrument using existing systems and sales techniques that are typically used to distribute merchandize in stores. For example, the distributor may receive a shipment of a box of pre-paid open type cards, each in a package that facilitates presenting the pre-paid cards. The packages may each contain, for example, a pre-paid card, and may bear identifying indicia, such as an account number or serial number. The account/serial number may facilitate, for example, tracking of inventory.

The distributor may place the pre-paid cards on a shelf, on a rack, or similar display, and allow customers to self select desired products. If the customer selects a gift card from the rack and presents it for purchase, the distributor may obtain customer information and may scan the package using the same optical scanner that is typically used for reading UPC codes to scan in the sale of other products. The distributor's computer is suitably configured to send a Fund/Init message to the issuer, and receive back an authorization. In various exemplary embodiments of the present invention the distributor receives payment for the transaction. In this example, the pre-paid card is given to customer 140 in connection with the transaction. Sales confirmation information may be batch transmitted, for example, at the end of the day. Thus, with minimal additional processes or investment in technology, the distributor may earn commissions or realize other incentives for distribution of additional product, e.g., a pre-paid card.

From the customer's perspective, in accordance with yet another aspect of the present invention, a customer obtains the benefit and convenience of obtaining a pre-paid open card through, for example, a local grocery store. The transaction instrument, e.g., prepaid card, may be displayed in a customer accessible manner. For example, a customer accessible manner may comprise any method of displaying a transaction instrument (e.g. pre-paid card) where the customer can physically select the transaction instrument or a device representing the same. The customer could also, however, obtain the pre-paid card in-person, over the telephone, on line, and/or the like. For example, a customer may enter a hardware store to purchase a product. At the check out stand, the customer sees a pre-paid card of a specific denomination and adds that to the items to be purchased. The customer may pay for the pre-paid card. The customer may then activate the card by calling a number on the card. During activation, the customer may provide the purchase location or other customer related information. Thus, the customer could use the card within minutes of purchasing the card.

An exemplary pre-paid card is the Gift Card by American Express. This product allows someone to load, for example, $25, $50, $100, or $500 onto a card and then give it to the gift recipient. The gift recipient may then buy merchandise on the card at any retailer or restaurant that accepts American Express. This exemplary Gift Card facilitates giving a gift that may be used at millions of merchants in contrast to a single store gift certificate/card, which has limited use. This system could be also be used with providers other than American Express and on various financial instruments.

Figure 3:
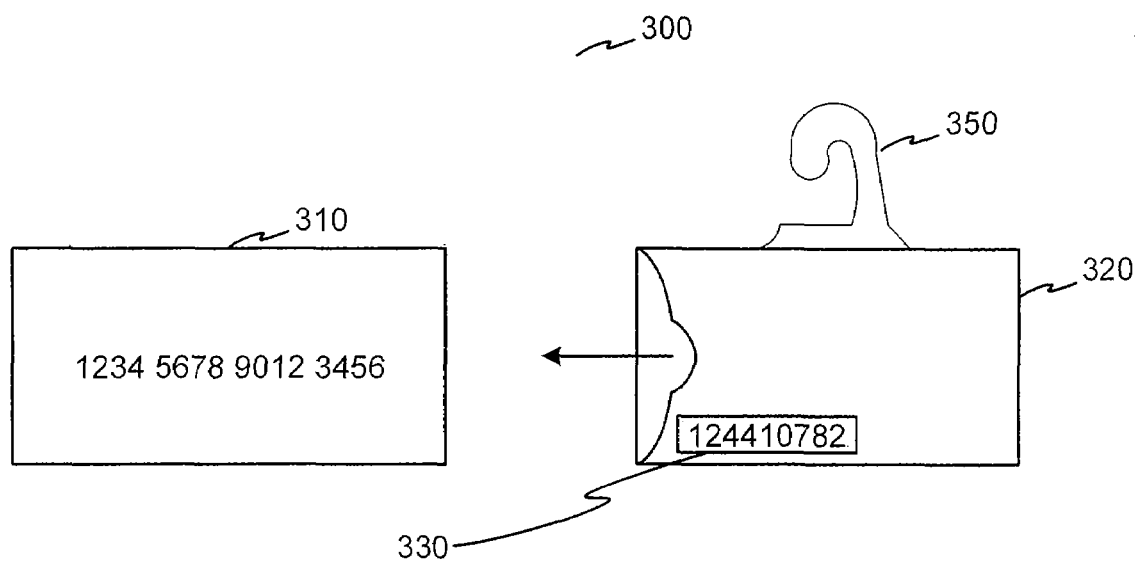
FIG. 3 illustrates an exemplary financial transaction instrument.

With reference now to FIG. 3, an exemplary transaction instrument distribution device 300 is suitably configured to facilitate distribution of a card or an account number by a distributor. Transaction instrument distribution device 300 may include a card 310 and a package 320. As discussed above, the "card" may simply be an account number, or an account number printed or encoded on any medium. Package 320, in accordance with exemplary embodiments, may be associated with card 310 when issued to the distributor.

Card 310 may include one or more physical devices used in carrying out various financial transactions. For example, card 310 may comprise a pre-paid card, rewards card, telephone card, smart card, magnetic stripe card, radio frequency card and/or the like. In yet another exemplary embodiment of the present invention, card 310 may be an electronic coupon, voucher, speed pass, and/or other such instrument. Card 310 may be used to pay for acquisitions, obtain access, provide identification, pay an amount, receive payment, redeem reward points and/or the like.

Card 310 may be associated with an account number/card number. Furthermore, an "account number", "card number", "code", "identifier" or "loyalty number", as used herein, includes any device, code, or other identifier/indicia suitably configured to allow the consumer to interact or communicate with the system, such as, for example, authorization/access code, personal identification number (PIN), Internet code, other identification code, and/or the like that is optionally located on a rewards card, pre-paid card, telephone card, smart card, magnetic stripe card, bar code card, radio frequency card and/or the like. The account number may be distributed and stored in any form of plastic, electronic, magnetic, radio frequency, audio and/or optical device capable of transmitting or downloading data from itself to a second device.

An account number may be, for example, a sixteen-digit card number, although each card provider has its own numbering system, such as the fifteen-digit numbering system used by an exemplary loyalty system. Each company's card numbers comply with that company's standardized format such that the company using a sixteen-digit format may generally use four spaced sets of numbers, as represented by the number "0000 0000 0000 0000". The first five to seven digits are reserved for processing purposes and identify the issuing bank, card type and etc. In this example, the sixteenth digit is used as a sum check for the sixteen-digit number. The intermediary eight-to-ten digits are used to uniquely identify the customer. In addition, loyalty account numbers of various types may be used.

In accordance with various exemplary embodiments of the present invention, serial number 330 is suitably configured to be related to a Travelers Cheque type number or a portion thereof. Thus, the serial number may be used in a system that otherwise is suitably configured for the sale of Travelers Cheques. Thus, the serialized number may be machine read from the surface of, for example, package 320, and sales confirmation information may be conveyed to issuing system 110.

Package 320 may comprise any suitable device that facilitates accessibly offering the transaction instrument to a consumer. For example, package 320 may simply comprise a peel off hook 350 attached to a card or an envelope or a cut-out to be placed on a hook. Furthermore, package 320 may comprise an envelope that wholly or partially surrounds a transaction instrument, such as a card. In one embodiment, package 320 conceals the account number associated with transaction instrument 310. In further embodiments, package 320 may comprise one or more windows for viewing or reading a bar code or magnetic strip on a card without the need to remove the card from the envelope. Moreover, the revealed portion may include or correspond to the serial number. Thus, the card may be packaged in a manner that the serial number is exposed and/or readable even when the card is packaged and/or that a bar code is on the outside of the package relating to the sequenced card number of a third party program partner. As illustrated in FIG. 3, in one exemplary embodiment, package 320 may also have indicia, e.g., an account or serial number, in the form of a bar code or magnetic strip, on the package itself. With regard to embodiments lacking a physical instrument, package 130 may be associated with a transaction account, for example, by providing a tangible object containing a transaction account number.

It is noted that the serial number may be the identification number of the third-party partner or of the issuer. In one embodiment, the various processes may include a user facilitating the input of information into a computer system. The information may be inputted via keypad, bar code reader, magnetic stripe, smart card, electronic pointer, touchpad and/or the like, into a user computer, POS terminal, kiosk, and/or ATM terminal. The information may be transmitted via any network.

In accordance with various exemplary embodiments of the invention, a reverse inventory management system is configured to 'locate' a group of financial transaction instruments after at least one of the financial transaction instruments in that group has been sold. Although primarily described herein in terms of financial transaction instruments, and more particularly in terms of financial transaction cards ("cards"), the description herein is equally applicable to other financial transaction instruments and to account numbers associated with financial transaction accounts.

In this regard, a retail sale or retail distribution refers to the distribution to the end user of the financial transaction instrument as opposed to the distribution or transfer of the financial transaction instrument down through the distribution chain (e.g., from the issuer down to the distributor who provides the financial transaction instrument to the end user). In addition, a distributor may have sub-entities to which financial transaction instruments are distributed and who may distribute the cards. For example, inventory may be assigned, in bundles, to various clerks, kiosks, departments, and/or like entities within a mall or department store.

As mentioned above, distributor system 130 may communicate information with issuer system 110 (directly or indirectly). In one exemplary embodiment, the information communicated includes the consumer name, an account number, a sequential number, the date of distribution of the transaction instrument, the time of distribution, the place of distribution, the name of the sales clerk, the entity responsible for the distribution, the type of transaction instrument distributed, and/or the like. The communicated information may be useful for reverse tracking of inventory as described further herein.

In general, an exemplary method comprises the steps of producing the cards, grouping a number of cards, associating the cards with each other and/or the group, keeping the card group together during the process of distributing the card groups to the merchants, distributing at least one of the cards in the card group, and recording in inventory the location of the remaining cards of that group after a card in that group is first distributed.

Figure 5:
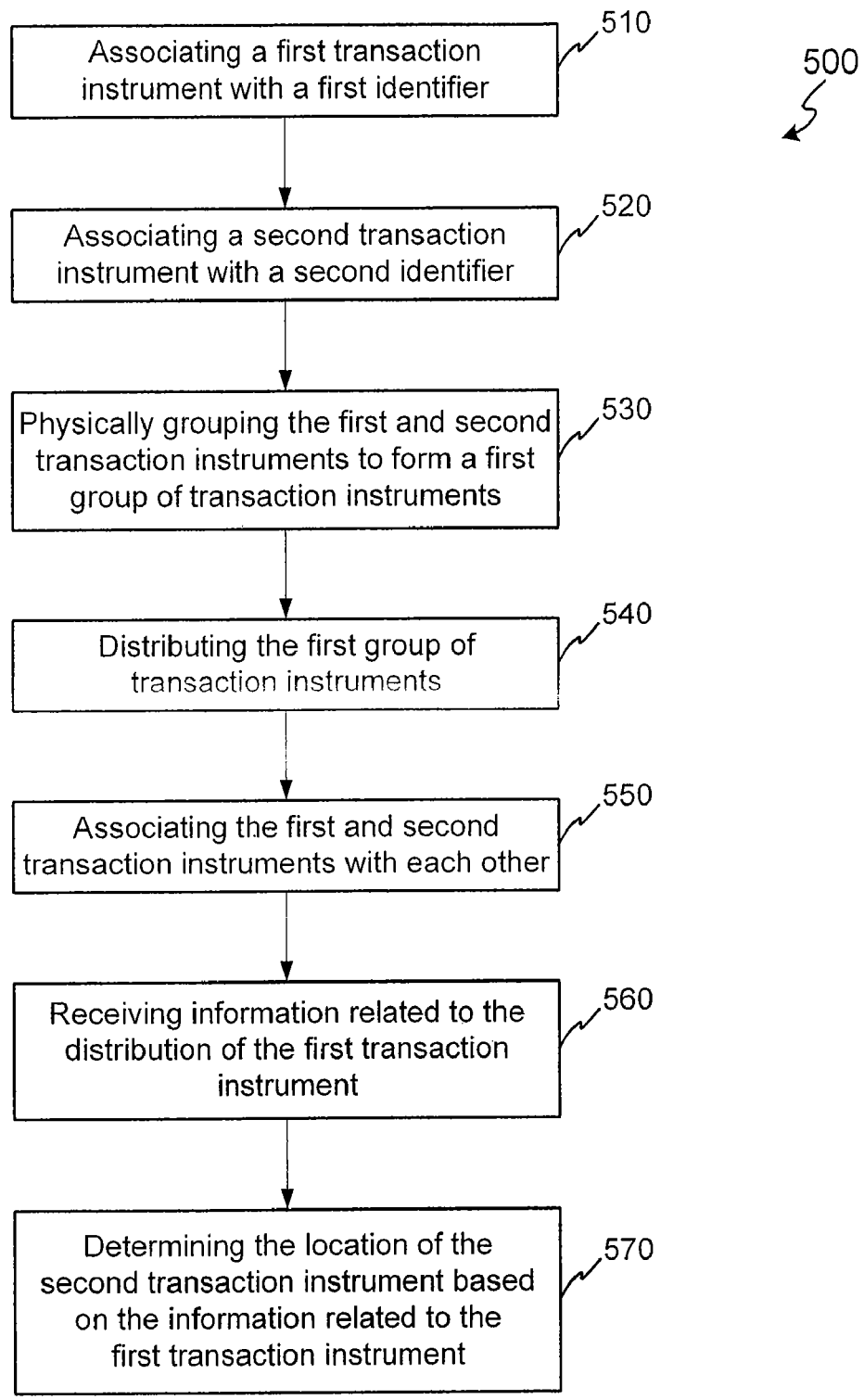
FIG. 5 illustrates a flow diagram showing an exemplary reverse inventory method.

In accordance with another exemplary embodiment, and with reference to FIG. 5, a reverse inventory method 500 may comprise the steps of producing financial transaction instruments, physically grouping more than one financial transaction instruments (step 530), distributing the group of financial transaction instruments (step 540), associating the grouped financial transaction instruments with each other (step 550), receiving information related to the distribution of a financial transaction instrument (step 560), and determining the location of other financial transaction instruments that are in the same group as the financial transaction instrument that was distributed (step 570).

Distribution of financial transaction instruments includes the distribution of account numbers, which are associated with financial transaction accounts. For example, an account number may be written on a paper that is distributed and later purchased. Although the invention contemplates all forms of distribution of financial transaction instruments and account numbers, for simplicity, an exemplary embodiment of the invention is described herein in terms of a distribution of a pre-paid card or a credit/charge card (a "card").

The issuer of a card may produce the card and/or packaging associated with the card. This may be accomplished, for example, through third-party production vendors (e.g., Oberthur Card Systems). The cards may be individually packaged, although in other embodiments, one, two, or more cards may be packaged for retail sale together ('retail sale package'). However, in various exemplary embodiments, the retail sale package comprises just the card itself. In one exemplary embodiment, a card may be placed in a cardboard or plastic container that is configured to securely hold the card and/or conceal all or portions of the card. In other embodiments, a hook may be removeably attached to the card. Furthermore, many other packaging methods may be used to prepare the cards for distribution.

Similarly, other types of financial transaction instruments may be suitably packaged for retail sale. For example, an account number associated with a financial transaction account may, for example, be printed on a paper or other object that is packaged for retail sale. As described in greater detail herein, the financial transaction instruments and/or retail packages may be associated with identifiers (steps 510 and 520). This association may be partially or completely produced by the production vendor, the issuer system, and/or both systems working together.

The individual retail sales package is configured to be uniquely identifiable. Thus, a unique identifier is associated with each retail sales package. The unique identifier may be formed of numbers, letters, symbols, and/or the like. In other exemplary embodiments, the unique identifier is a serial number. For example, the serial numbers may be sequential numbers within each distribution group of individual retail sales packages. However, it is noted that in some embodiments, the unique identifier may be a random number associated with the retail sales package. Typically, the unique identifier is a separate identifier from the account number associated with the financial transaction account, financial transaction instrument, or debit/credit card. However, in one embodiment, the unique identifier is the account number.

For simplicity, the unique identifier is described herein as being associated with the card. However, the unique identifier may be associated with at least one of the individual retail sales package, with the card, or other packaged object. Furthermore, the unique identifier (or any other identifier discussed herein) may be in the form of a printed indicia, bar code, electronic identifier (e.g., on a smart card, coded in a transponder), stored on a magnetic stripe, and/or the like. In other embodiments, the unique identifier is printed on the card or package. In accordance with another exemplary embodiment of the invention, a unique group identifier may be associated with each distribution group (as described herein).

In one exemplary embodiment, the cards are each configured to have a serial number. For example, the cards may have a serial number printed on the surface of the card. In another example, the serial number may be incorporated into the magnetic stripe or stored in a machine readable manner on the card. Furthermore, the serial number may be a sequential number such as, for example, Traveler's Cheque numbers. The unique identifier, account number, unique group identifier, number of cards in the group, and/or like information may be stored in a database, look up table, and or the like.

In accordance with one exemplary embodiment of the invention, the individual retail sale package is grouped together with other individual retail sale packages. The groups (or bundles) may comprise two or more packages. Although any number of individual retail sale packages may comprise a group of cards, in one embodiment, 25 individual retail sale packages are packaged together to form a group ("distribution group"). Moreover, the number of retail sale packages in a bundle may vary from bundle to bundle. The number of cards in a bundle may be varied, for example to suit a specific retailer's requirements. Furthermore, the type of card or package may vary within the bundle or from bundle to bundle. For example, one bundle may contain a variety of packages each holding one, two, or six cards. In another example, one bundle may contain retail packages each containing one card and another bundle may contain retail packages each containing two cards. Similarly, the valuation of prepaid cards and other similar types of information may vary from package to package or from bundle to bundle, and/or the like.

Figure 6:
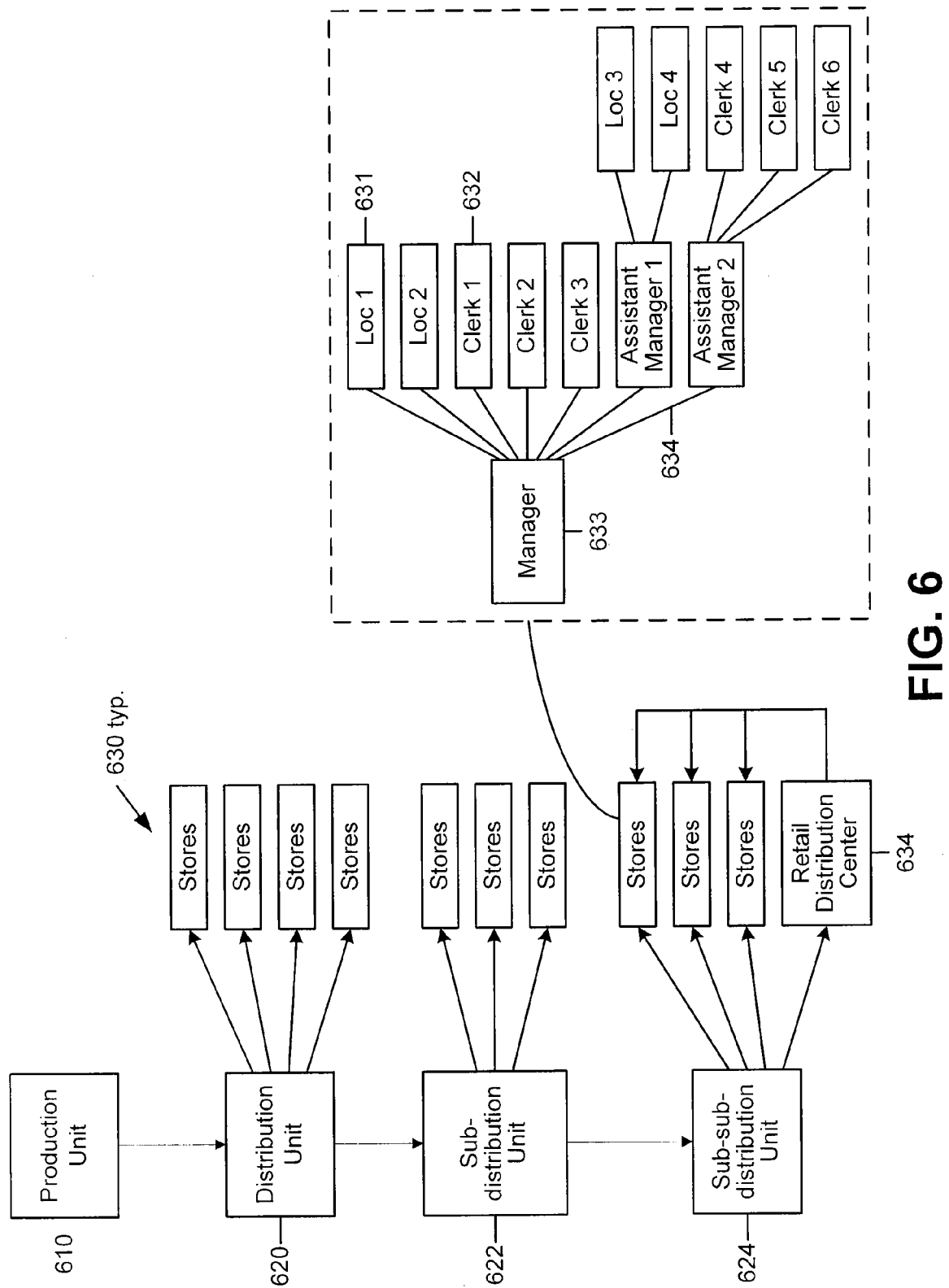
FIG. 6 illustrates a block diagram of an exemplary distribution channel.

The production vendor may be configured to ship a bundle (distribution group) of cards directly to issuer 110, or to third-party distribution vendor 120. System 100 may further be configured to transfer/distribute the bundles through a distribution chain to the retail distributor. With momentary reference to FIG. 6, an exemplary distribution chain is illustrated as having a production vendor 610, a distribution unit 620, a sub-distribution unit 622, a sub-sub-distribution unit 624, a retail distribution center 634, and stores 630. In accordance with various exemplary embodiments of the invention, issuer 110, third-party distribution vendor 120, distribution center 634, and/or a combination of these entities may transfer/distribute the bundles/groups through a distribution chain to retailers, stores, merchants, and/or the like ("retailers"). One exemplary third party distribution vendor is Incomm. The distribution vendor(s) may transfer/distribute the card bundles intact through out the supply chain/stages of distribution to retailers.

For example, production vendor 610 may ship several bundles to distribution unit 620 which may in turn ship a portion of those bundles to sub-distribution units 622. Sub-distribution unit 622 may transfer/distribute a portion of the bundles it receives to sub-sub-distribution unit 624. Any of these distribution entities (e.g., 610, 620, 622, and/or 624) may be configured to transfer/distribute a portion of the bundles they posses to stores or to a retail distribution center 634 related to stores 630. Although described herein as a store, the store may be any entity as described with respect to distribution system 130 and merchants herein.

Upon receipt of a bundle of cards at a retail selling location, in one exemplary embodiment, the bundle is opened and the individual retail packages are displayed via merchandise stands, racks, counters, and/or the like, for distribution to consumers. In yet another embodiment, the card bundles received by a retailer may be transferred/assigned, intact, to a particular department, check out stand, sub-entity, kiosk, employee, and/or the like associated with the retailer. In that example, upon reaching the location associated with the retailer, the bundle may be opened and the individual retail packages may be offered to customers. For example, a store may transfer intact bundles to particular locations 631 within the store, to specific clerks 632 within the store, or to managers/assistant managers (e.g., 633 and 634) within the store. The managers/assistant managers may further transfer the bundles. Thus, identifying the location of a financial transaction account/retail sale package may include determining the physical location of the retail sales package and/or card. Furthermore, identifying the location of a financial transaction account/retail sale package may include identifying the name of the store, the identification of the clerk, the identification of the manager/assistant manager, the department, the point-of-sale terminal, the building, the country, and/or the entity responsible for the retail distribution of the financial transaction account, and/or in possession thereof.

Typically, the individual retail packages are sold to the consumers. However, as described herein, the packages may be given away as promotional devices, or may be distributed to consumers in other ways. Furthermore, as described herein, an individual retail sale package may be offered to the consumer in a publicly accessible manner, for example, in high foot traffic areas of the store, and/or within reach of the customers. In other examples, the card is held behind the customer service desk.

In various embodiments, the financial transaction instruments are open financial transaction instruments. As described herein, the ability to track these instruments to the point of sale/point of distribution to customers may facilitate enhanced security and fraud prevention. Furthermore, the ability to track these cards may facilitate re-claim of expired/expiring cards. Thus, the methods and systems for retroactively tracking financial transaction instruments may facilitate providing these instruments to customers in a customer accessible environment, and may thus enhance the distribution of the financial transaction instruments.

When an individual retail package is sold/distributed to a customer, or during the process thereof, the unique identification number associated with that individual retail package is communicated to the issuer. This information may be communicated directly to issuer 110, or by way of intermediate processing. For example, third-party distribution partner 120 may receive the information and pass the information along to the issuer. In one example, a serial number associated with the individual retail package may be communicated to third-party distribution partner 120, which may be configured to translate and/or pass that information along to issuer 110 (step 560). This information may be communicated, for example, with the reconciliation file, as a batch process, and/or the like.

Based on this unique identification number, and or other information that is commonly provided with such communications/reconciliation files, the reverse inventory management system may be configured to determine the location of other the cards associated with that the distributed card's group.

Reverse inventory management system 100 may also be configured to determine whether a card is sold or unsold, at a particular retailer, at a particular sub-entity associated with that retailer, and/or the like ("inventory status"). Reverse inventory management system 100 may also be configured to identify all of the individual retail packages (or all of the remaining un-distributed individual retail packages) that are associated with the bundle to which one unique identification number belonged. Thus, the reverse inventory management system is based on the distribution of at least one card, out of a group of cards, and the assumption that all other cards associated with the same group as that one card are at the same location.

Information communicated to an issuer indicating that one card has been sold (and the location of that sale) may be used to identify all other cards that were also in that bundle. For example, each card's unique identification number may be associated with the unique ID of every other card, for example in a database/look-up table. By searching the database using the unique ID of the card first sold of a bundle of cards, the system may determine/identify the unique ID numbers of all of the cards that are associated with that bundle. It may be assumed that each of the cards in that bundle, or each of the cards remaining in that bundle, are at that location. In this manner, the inventory data associated with of each card may be updated to reflect the inventory status (e.g., location) of that card.

In another exemplary embodiment, a bundle identifier may be electronically associated with each serial numbered card. Thus, when one card is sold, the serial number of the sold card can be used in a database/look-up table to identify the bundle of which it was a part, and then that bundle identifier can be used to look up all the card serial numbers that were also associated with that bundle.

In yet another exemplary embodiment, a sequential serial number may be associated with each card in a group of, for example, 10 cards. In this example, the number of cards in the group and the starting serial number for that group are stored in a database. Therefore, when a card is sold, the system is configured to determine to which group the sold card belongs. For example, when the first card in the group is sold, the card's unique identification number is identical to an identification number in a database or look up table. Otherwise, the sold card unique identification number may be within 10 of the first number of the group. For example, the system may add or subtract any number between 1 and 10 from the identification number, then compare the result to an identification number in the table. When a card of that group is first sold, the system may update the record of each card to reflect its inventory status. In one embodiment, the system may update the applicable group's inventory status.

With sequential numbered cards, it may be convenient to only store the serial number of the first card in the bundle and the number of cards in the bundle. Thus, in yet another exemplary embodiment, the unique identification number may correspond to a unique group ID number and the system is configured to determine the group ID number based on the unique ID number of the first sold card. The group ID number is then updated to reflect the inventory status of the group. The location of individual cards may be determined by reference to the location of its corresponding group. Furthermore, other methods may also be used wherein the distribution of one card in a group of cards makes possible tracking and inventory functions with respect to all of the other cards in its group.

As described herein, Travelers' Cheque systems or other pre-existing serial number based inventory systems, and other transaction instrument systems may already be configured to perform inventory functions. The utility of these systems may be leveraged by providing the above determined location information to these pre-existing inventory systems.

In accordance with various exemplary embodiments, each time a card is sold, the inventory status may be updated. Thus, the system may be configured to track changes in the inventory status ("dynamic inventory tracking"). For example, the system may be programmed to alert the issuer if part of a group of cards is distributed by one retailer and then part of the group is distributed by another retailer. The system may also be configured to record the location of each card sold for inventory and fraud prevention reasons. Thus, the system is configured to perform tracking of specific serialized inventory down to the store level or lower for purpose of loss control and inventory management (obsolete product recall, changing terms and conditions, expired product, etc.) In addition, system 100 may be configured to modify the location of all the remaining cards/retail sale packages. In this manner, if inventory moves from one location to another, the inventory status may be updated.

One of the benefits of the invention is that it may tend to increase an issuer's prepaid card business. The inability to track and perform inventory management on cards may be one barrier to distributing the product in open retail environments with enormous foot traffic and sales potential. The reverse inventory management system may also facilitate detailed tracking of specific serialized prepaid cards down to the specific selling location level for purposes of loss control and inventory management. Other benefits may include the lowering of operating expenses. For example, reverse inventory management processes may reduce fraud losses and operational costs related to inventory management. The reverse inventory management system may increase the quantity/quality or performance of the issuer's existing services. For example, the reverse inventory management system may improve the ability for the issuer to service the needs of its selling partners and its end customers for these products. The reverse inventory management system may also facilitate selling of cards through a check-out lane and controlling/reducing associated losses and costs. In addition, the reverse inventory management systems and methods may be configured to leverage pre-existing travelers Cheque inventory systems and/or other serial number based pre-existing inventory systems.

Furthermore, the reverse inventory management system may be advantageous to retailers because in some cases, fraud losses on unsold/inactive cards presented and honored under floor limits at the accepting merchants can be traced back and charged to fraud at the original stocking location. In addition, third party sellers may be able to reduce the amount of additional cost and effort involved to meet issuer requirements for tracking and managing inventory. The reverse inventory management system may facilitate inventory management without additional process or systems at the distribution vendors or at the retail level. Furthermore, it may facilitate integration of shipping and receiving financial transaction products and similar products in order to reduce handling and merchandising overhead.

Moreover, the reverse inventory management system may be advantageous to customers. For example, customers that have accidentally walked away from the retail selling location without completing the sales transaction for their card can be directed back to the appropriate original stocking location to remedy the oversight.

The present invention may be described herein in terms of functional block components, optional selections and/or various processing steps. It should be appreciated that such functional blocks may be realized by any number of hardware and/or software components suitably configured to perform the specified functions. For example, the present invention may employ various integrated circuit components, e.g., memory elements, processing elements, logic elements, look-up tables, and/or the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, messaging, data processing, network control, and/or the like. Still further, the invention could be used to detect or prevent security issues with a client-side scripting language, such as JavaScript, VBScript or the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography & Network Security: Principles & Practice" by Mayiam Stalling, published by Prentice Hall; all of which are hereby incorporated by reference.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. It should be noted that many alternative or additional functional relationships or physical connections might be present in a practical transaction instrument distribution system.

As may be appreciated by one of ordinary skill in the art, the present invention may be embodied as a method, a data processing system, a device for data processing, a financial transaction instrument, and/or a computer program product. Accordingly, the present invention may take the form of an entirely software embodiment, an entirely hardware embodiment, or an embodiment combining aspects of both software and hardware or other physical devices. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

These computer program instructions may also be stored in a computer-readable memory that may direct a computer or other programmable data processing apparatus to function in a particular manner, such that the instructions stored in the computer-readable memory produce an article of manufacture including instruction means which implement functions of flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus include steps for implementing the functions specified in the flowchart block or blocks.

In the foregoing specification, the invention has been described with reference to specific embodiments. However, it may be appreciated that various modifications and changes may be made without departing from the scope of the present invention. The specification and figures are to be regarded in an illustrative manner, rather than a restrictive one, and all such modifications are intended to be included within the scope of present invention. Accordingly, the scope of the invention should be determined by the appended claims and their legal equivalents, rather than by the examples given above. For example, the steps recited in any of the method or process claims may be executed in any order and are not limited to the order presented.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

What is claimed is:

1. A method for distributing an open transaction instrument, in a retail environment, comprising:
    offering the open transaction instrument to a consumer, wherein the open transaction instrument is directly accessible by the consumer, and wherein the open transaction instrument is associated with a transaction account;
    acquiring a tracking code, wherein at least one of: a package and the open transaction instrument includes the tracking code, wherein the package contains the open transaction instrument, wherein the tracking code is associated with an account code, and wherein the open transaction instrument includes an account code; and,
    receiving approval of the tracking code to enable a purchase of the open transaction instrument.

2. The method of claim 1, further comprising receiving approval of the tracking code by transmitting the tracking code to a third party for approval, and receiving from the third party an approval related to the tracking code.

3. The method of claim 1, further comprising facilitating funding of the open transaction instrument.

4. The method of claim 1, further comprising facilitating funding of the open transaction instrument by facilitating at least one of: initial loading of funds, partial funding, re-loading funds and funding at a time subsequent to purchase.

5. The method of claim 1, further comprising facilitating activating the open transaction instrument.

6. The method of claim 1, further comprising facilitating activating the open transaction instrument at least one of: before, during and after funding of the open transaction instrument occurs.

7. The method of claim 1, further comprising facilitating funding the open transaction instrument at least one of: before, during and after activation of the open transaction instrument occurs.

8. The method of claim 1, further comprising enabling the consumer to at least one of: fund and activate the open transaction instrument via at least one of: computer, personal digital assistant, cellular phone, website, mail, email, telephone, and facsimile.

9. The method of claim 1, further comprising causing the transaction account associated with the transaction instrument to have a monetary amount that is available when the transaction instrument is activated.

10. The method of claim 1, further comprising facilitating activating the transaction account associated with the open transaction instrument at a time subsequent to the time when the transaction account is caused to have a monetary amount.

11. The method of claim 1, further comprising facilitating activating the transaction account associated with the open transaction instrument at a time subsequent to the time when the transaction account is caused to have a monetary amount, wherein activating the open transaction instrument occurs automatically.

12. The method of claim 1, wherein the step of receiving approval of the tracking code includes use of a personal identification number (PIN).

13. The method of claim 1, wherein the open transaction instrument is the account code.

14. The method of claim 1, wherein the open transaction instrument is at least one of: the account code printed on paper, the account code encoded into an RFID device, and a signal of the account code transmitted to a personal digital assistant of the consumer.

15. The method of claim 1, wherein the tracking code is presented in at least one of: a numerical format, a code format, bar code format, encrypted format, radio frequency format, and magnetic stripe format.

16. The method of claim 1, wherein the account code is presented in at least one of: a numerical format, a code format, bar code format, encrypted format, radio frequency format and magnetic stripe format.

17. The method of claim 1, wherein the account code is visually displayed on the open transaction instrument.

18. The method of claim 1, wherein receiving approval includes receiving a confirmation of the tracking code.

19. A method for processing a payment from an open transaction instrument purchased in a retail environment, comprising:
    sending a request to debit a purchase amount from a balance of a transaction account associated with the open transaction instrument, wherein an account code is associated with the transaction account, wherein at least one of: a package and the open transaction instrument includes a tracking code, wherein the package contains the open transaction instrument, and wherein the open transaction instrument was directly accessible by the consumer and activated using the tracking code; and,
    receiving at least one of:
        (i) at least one approval that the transaction account associated with the open transaction instrument is a valid transaction account and has a balance that is at least equal to the purchase amount such that the balance is reduced by the purchase amount; and,
        (ii) receiving a decline of the request when the transaction account associated with the open transaction instrument has a monetary amount balance that is less than the purchase amount.

20. The method of claim 19, wherein the purchase amount includes at least one of: cash equivalent value and loyalty points.

21. The method of claim 19, wherein the balance includes at least one of: cash equivalent value and loyalty points.

22. The method of claim 19, further comprising receiving from the consumer a personal identification number (PIN) for conducting transactions with the open transaction instrument.

23. The method of claim 19, wherein the open transaction instrument is configured to be generally accepted by at least one of: merchants that are not directly affiliated with each other, merchants within one shopping mall, merchants within one payment network, merchants within one country, and merchants within one geographic region.

24. A method for purchasing from a merchant within a retail establishment an open transaction instrument included in a package, comprising:

selecting the package from a directly accessible location within the retail establishment, wherein the open transaction instrument is associated with a transaction account, and wherein an account code is associated with the open transaction instrument and at least of: the package and the open transaction instrument includes a tracking code;

purchasing the open transaction instrument by providing funds to the merchant, wherein the merchant transmits the tracking code for approval.

25. The method of claim 24, further comprising receiving from the consumer a personal identification number (PIN) for conducting transactions with the open transaction instrument.

* * * * *

UNITED STATES PATENT AND TRADEMARK OFFICE
CERTIFICATE OF CORRECTION

| | | |
|---|---|---|
| PATENT NO. | : 7,455,222 B2 | Page 1 of 1 |
| APPLICATION NO. | : 11/844663 | |
| DATED | : November 25, 2008 | |
| INVENTOR(S) | : Beck et al. | |

It is certified that error appears in the above-identified patent and that said Letters Patent is hereby corrected as shown below:

On the title page, Item (75) Inventors, please delete "John" and insert therefore --Jon--.

In Column 30, line 5, after least please insert --one--.

Signed and Sealed this

Third Day of February, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,455,222 B2 | |
| APPLICATION NO. | : 11/844663 | |
| DATED | : November 25, 2008 | |
| INVENTOR(S) | : Randall G. Beck et al. | |

It is certified that error appears in the above-identified patent and that said Letters Patent is hereby corrected as shown below:

On the Title Page, section (75) Inventors, please delete "Randy Beck" and insert therefor
--Randall G. Beck--.

Signed and Sealed this
Twenty-fifth Day of January, 2011

David J. Kappos
*Director of the United States Patent and Trademark Office*

UNITED STATES PATENT AND TRADEMARK OFFICE
Certificate

Patent No. 7,455,222 B2                                        Patented: November 25, 2008

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Randy Beck, Alpine, UT (US); Gennye Feldman Krasner, New York, NY (US); John Steven Imada, Dewey, AZ (US); Paula S. Simper, North Salt Lake, UT (US); Sven Miller, Salt Lake City, UT (US); Clyde Page, South Jordan, UT (US); and Steven J. Keiser, South Jordan, UT (US).

Signed and Sealed this Thirtieth Day of September 2014.

*MICHAEL LEE*
*Supervisory Patent Examiner*
Art Unit 2876
Technology Center 2800